(12) United States Patent
Furuya

(10) Patent No.: US 7,799,241 B2
(45) Date of Patent: Sep. 21, 2010

(54) LIQUID FOR PREVENTING DISPERSION OF OR FOR FIXING DISPERSIBLE DUST

(76) Inventor: Akinori Furuya, 2-8-18 Harue-cho, Edogawa-ku, Tokyo (JP)

(*) Notice: Subject to any disclaimer, the term of this patent is extended or adjusted under 35 U.S.C. 154(b) by 234 days.

(21) Appl. No.: 12/007,055

(22) Filed: Jan. 4, 2008

(65) Prior Publication Data

US 2009/0173911 A1 Jul. 9, 2009

(51) Int. Cl.
*C09K 3/22* (2006.01)

(52) U.S. Cl. .................. 252/88.1; 252/88.2; 504/358
(58) Field of Classification Search .................. None
See application file for complete search history.

(56) References Cited

U.S. PATENT DOCUMENTS

2007/0037711 A1* 2/2007 Pluta et al. ................. 504/358

* cited by examiner

*Primary Examiner*—Necholus Ogden, Jr.
(74) *Attorney, Agent, or Firm*—Michael Tobias

(57) ABSTRACT

A fixing liquid for properly and economically suppressing or preventing dispersion of dust (asbestos dust) generated through weathering or demolition of a sprayed-on material containing asbestos is prepared by homogeneously incorporating a surfactant and a thickener (e.g., CMC) into a solution of a polysaccharide (e.g., gum arabic). When an appropriate amount of the fixing liquid is sprayed onto a sprayed-on material containing asbestos, dust due to weathering of the sprayed-on material is wetted and retained, and dispersion of dust generated during demolition of the material is suppressed or prevented. Even after drying of the fixing liquid, the viscosity of the liquid is restored by re-wetting with water, and dispersion of dust generated during demolition of the thus-treated material is suppressed or prevented. Since the thickener has an increased volume in the presence of water, the thus-treated material is readily removed.

12 Claims, No Drawings

LIQUID FOR PREVENTING DISPERSION OF OR FOR FIXING DISPERSIBLE DUST

BACKGROUND OF THE INVENTION

1. Field of the Invention

The present invention relates to a liquid for fixing or sterilizing dust (e.g., asbestos dust, ash containing dioxin, or dust containing microorganisms such as viruses), or for preventing dispersion of such dust which is generated by, for example, weathering of heat-insulating, refractory, anti-dewing, heat-retaining, or sound-absorbing sprayed-on materials containing asbestos, by demolition of incinerators or building materials containing asbestos, or by exchange or removal of microorganism filters (e.g., HEPA filters).

2. Background Art

Recently, concern has arisen about airborne dispersion of dust (asbestos dust) generated by weathering or demolition of sprayed-on materials containing asbestos adversely affecting the health of people living in neighboring areas.

Therefore, a demand has arisen for rapid removal of existing, weathered sprayed-on materials containing asbestos, or rapid removal or demolition of weathered building materials containing asbestos. Conventionally and generally employed methods for preventing dispersion of dust resulting from demolition or removal of weathered asbestos-containing sprayed-on materials or asbestos-containing building materials include a method in which an object to be worked on (which may be referred to below as a "work target") is covered in advance with a sheet so as to be blocked from the outside. In another method, water containing a surfactant is applied to an existing sprayed-on material so as to completely wet the material and suppress formation of dust during working. After removal of the sprayed-on material, a liquid containing an organic polymer resin agent is applied to the surface of the remaining building material so as to fix the remaining dust (see "Manual for Preventing Exposure to Asbestos Dust in Demolition of Buildings", Department of Planning and Development, Japan Construction Occupational Safety and Health Association, First Edition, Aug. 9, 2005).

However, isolating a work target from the outside by use of a sheet is only an auxiliary means, and it is difficult for this method to completely prevent dispersion of dust.

A method in which water is applied to a work target so as to suppress generation of dust (i.e., a method in which a work target is impregnated and wetted with water so as to suppress generation of dust) requires a large amount of water during working in order to prevent the target from drying. Therefore, this method poses problems such as that waste water treatment equipment must be provided before working, and that additional treatment is required for preventing dispersion of dust which would otherwise be generated after sludge generated by the waste water treatment has been dried.

Application of a liquid containing an organic polymer resin agent poses problems such as that evaporation of a volatile solvent contained in the resin agent requires control of the concentration of the volatile solvent in a closed space during working or treatment of generated toxic gas, and that adhesion between a work target and a concrete surface or a steel frame surface is enhanced due to drying of the resin agent, making it difficult to demolish the work target.

As a result, as time passes, dust is likely to be generated during removal or demolition of the work target.

SUMMARY OF THE INVENTION

In order to solve the problems of the aforementioned conventional methods, an object of the present invention is to provide a liquid for effectively preventing wide dispersion of dust (asbestos dust) which would otherwise be generated through weathering or demolition of, for example, a sprayed-on material, or for fixing the dust in an easy and economical manner so as to perform treatment/demolition of a sprayed-on material containing asbestos in a hygienic environment and facilitate the treatment of the material.

The present invention provides a liquid for preventing dispersion of dispersible dust (e.g., asbestos dust) or fixing the dust (below, the liquid may be referred to as the "fixing liquid"), the liquid comprising an aqueous solution of a polysaccharide (e.g., gum arabic), a surfactant, and a thickener, wherein the surfactant and the thickener are homogeneously incorporated into the aqueous solution. When the liquid of the present invention is sprayed onto an object to be treated (below, the object may be referred to as a "treatment target"), such as a sprayed-on material, the treatment target is wetted through natural permeation of the liquid, whereby fixation of dust is achieved.

Since the liquid of the present invention contains a surfactant in an appropriate amount, the liquid can readily permeate through a treatment target naturally to exhibit a wetting effect and a sterilizing effect.

When a treatment target is wetted with the liquid of the present invention, dispersion of dust (asbestos dust) is suppressed through retention of the dust by virtue of the viscosity of a polysaccharide (e.g., gum arabic) contained in the liquid, followed by fixation of the dust by drying of the liquid.

When a treatment target is wetted with the liquid of the present invention, a thickener contained in the liquid contributes to an increase in viscosity and thus interacts synergistically with a polysaccharide in fixing of dust. However, since the thickener exhibits low adhesion in the presence of water, the treatment target is readily removed through re-wetting after drying of the liquid.

Even after drying of the liquid of the present invention, the viscosity of the liquid is restored simply by supplying water thereto, and generation of dust can be suppressed. Namely, once a treatment target is treated with the fixing liquid, dust is retained thereon, and dispersion of dust is suppressed (prevented). Even after drying of the liquid, the viscosity of the liquid (solidified portion) is readily restored by supplying water thereto, and dispersion of dust can be suppressed. In addition, the treatment target is readily removed through the effect of, for example, a thickener contained in the liquid.

Once the liquid of the present invention is sprayed onto a treatment target, the target can be wetted and dust can be fixed.

Since the liquid of the present invention is in the form of a solution, there is no risk of generation of toxic gas during treatment.

When the fixing liquid, which is prepared by homogeneously incorporating a surfactant and a thickener (e.g., carboxymethylcellulose) into an aqueous solution of a polysaccharide (e.g., gum arabic), is sprayed onto a weathered sprayed-on material containing asbestos so as to allow the liquid to naturally permeate through the sprayed-on material, a substance which is contained in the sprayed-on material and which can be converted into dust is retained by virtue of the adhesive property of the liquid, and dust is prevented from dispersing to the outside during demolition of the sprayed-on material.

Even when a sprayed-on material treated (sprayed) with the fixing liquid of the present invention is dried, the viscosity of the fixing liquid is readily restored by supplying water. Therefore, even when a long period of time elapses after treatment with the liquid, generation of dust can be suppressed during removal or demolition of the sprayed-on material. Also, in the presence of water, the volume of the thickener increases, thereby contributing to easy removal of the thus-treated sprayed-on material from a base. Since the thus-treated sprayed-on material exhibits lubricity by virtue of the fixing liquid, the material is readily removed, and no dust is generated after removal of the material.

The liquid of the present invention achieves fixation, to a filter, of microorganisms such as viruses or bacteria dispersed during demolition of an incinerator deposited with ash containing dioxin or through exchange or demolition of a high-efficiency anti-bacterial filter for preventing microorganism contamination (a HEPA filter) of, for example, a biohazard facility, as well as sterilization of such microorganisms. The liquid of the present invention, which contains a surfactant in an appropriate amount, achieves fixation of water-repellent dust (e.g., oily dust).

Experience has shown that most of the cost of fixation of dust from a weathered asbestos-containing material or for demolition/removal of the material is the cost of treatment for preventing dispersion of dust (i.e., the preliminary step of such a process). Therefore, in general, the features and ease of handling of a dust-dispersion-preventing or dust-fixing liquid employed greatly affect whether such dust-dispersion-preventing treatment can be performed in an economical and proper manner. The liquid of the present invention, which has the aforementioned features, is considered suitable for performing fixation of dust from a weathered asbestos-containing material or demolition/removal of the material in a hygienic and economical manner.

DESCRIPTION OF PREFERRED EMBODIMENTS

No particular limitation is imposed on the components employed in the liquid of the present invention, so long as they are capable of being employed as an adhesive, a surfactant, and a thickener. Thus, the components of the liquid are not necessarily limited to those described in the example. However, the thickener to be employed in the present invention preferably exhibits a volume-increasing effect that leads to disintegration of the material on which the thickener-containing solution is sprayed. From this viewpoint, the thickener is preferably carboxymethylcellulose (CMC). The proportions of the components of the composition are determined so that the expected effects of the respective components do not interfere with one another. When the polysaccharide, surfactant, and thickener of the present invention are gum arabic, polyethylene glycol, and CMC, respectively, a typical composition comprises 1-7 wt % of gum arabic, 0.01-2 wt % of PEG, 0.1-2 wt % of CMC, and a balance of water. A preferred composition comprises 2-6 wt % of gum arabic, 0.5-1.5 wt % of PEG, 0.5-1.5 wt % of CMC, and a balance of water.

Example

| Formulation (weight %) | |
| --- | --- |
| Gum arabic powder | 5% (adhesive) |
| Polyethylene glycol (PEG 4000) | 1% (surfactant) |
| Carboxymethylcellulose (CMC) | 1% (thickener) |
| Water | 93% |

Preparation of Fixing Liquid

The above components are homogeneously dissolved in hot water at 60 to 80 degrees C.

Spraying Method

A mist of the fixing liquid is sprayed at low pressure by means of a plunger pump. A spray nozzle of a sprayer is disposed at a distance of about 30 cm from the surface of a treatment target (sprayed-on material). The fixing liquid is evenly and gently sprayed at the surface of the treatment target at an angle of 45 degrees to 90 degrees so that the diameter of the area on which the liquid is sprayed is about 30 cm to about 50 cm. In this case, the spraying pressure is regulated so as to prevent dispersion of the sprayed-on material. It should be confirmed that surface tension of the fixing liquid does not occur at the sprayed surface.

Spraying amount: a volume corresponding to about 20% to about 30% of the volume (as calculated on the basis of thickness) of a treatment target (in the case where a treatment target has a thickness of 1 to 3 cm). Typically an asbestos material absorbs and retains water in an amount about 5 times its own weight. Therefore, the spraying amount should be lower than that (to prevent dripping or running) but still such an amount that it sufficiently wets the target.

Example: 1 L/m$^2$ (This amount is within a range such that removal or disintegration of the sprayed-on material (which would otherwise occur due to the weight of water) does not occur)

Effects of the Fixing Liquid

The dust level was measured during working. The results are as follows.

(1) Dust Level Measurements

| | |
| --- | --- |
| Dust level before working | 0.03 mg/m$^3$ |
| Dust level during working | 0.016 mg/m$^3$ |
| Dust level after working | 0.018 mg/m$^3$ |

(2) Asbestos Analysis

| | |
| --- | --- |
| Before working: | The target contained 50 wt % asbestos |
| Asbestos level in the air during working: | 0.06 fibers/m$^3$ |
| Asbestos level in the air after working: | Not detected |
| Fire resistance after treatment: | No change |

Measurement Method:

Sampling—Samples were collected by suction by use of a low-volume air sampler according to the "Working Environment Measurement Guidebook I" (published by Japan Association for Working Environment).

Analysis of dust level—The dust level was analyzed and determined according to the method described in the "Working Environment Measurement Guidebook I".

Counting of asbestos—Asbestos fibers were counted according to the "Asbestos Monitoring Manual" published by the Ministry of the Environment of Japan.

Refractory or heat-insulating sprayed-on materials containing asbestos are applied to a variety of buildings in cities or their surrounding areas, including public buildings, factories, and individual houses. In many cases, such asbestos-containing building materials have undergone changes over time (i.e., weathering of the materials has occurred), and when health damage by asbestos is discovered, it is often desirable to remove or demolish the materials as soon as possible.

However, most such asbestos-containing building materials are employed in cities, and airborne dispersion of asbestos dust during working (removal or demolition of the materials) may adversely affect the health of people living in neighboring areas. It is believed that the liquid of the present invention is particularly effective when it is applied to fixation of dust from weathered asbestos-containing building materials or demolition of the materials.

This application incorporates by reference the disclosure of Japanese Patent Application No. 2006-187831, filed on Jul. 7, 2006.

What is claimed is:

1. A liquid for preventing dispersion of dispersible dust or fixing the dust, the liquid consisting of an aqueous solution of gum arabic, carboxymethylcellulose, and polyethylene glycol.

2. A method of suppressing dispersion of dust comprising applying the liquid as claimed in claim 1 to a dust-generating asbestos-containing material on a surface of an object to wet the material, and then removing the material from the object.

3. A method as claimed in claim 2 including spraying the liquid onto the material.

4. A method as claimed in claim 2 including applying a sufficient amount of the liquid to permeate the material.

5. A method as claimed in claim 2 wherein the material is one which generates water-repellent dust.

6. A method of fixing microorganisms comprising applying the liquid as claimed in claim 1 to a filter for removing microorganisms.

7. A liquid as claimed in claim 1 wherein the polyethylene glycol is PEG 4000.

8. A liquid as claimed in claim 1 consisting of 1-7 wt % of gum arabic, 0.01-2 wt % of polyethylene glycol, 0.1-2 wt % of carboxymethylcellulose, and a balance of water.

9. A liquid as claimed in claim 1 consisting of 2-6 wt % of gum arabic, 0.5-1.5 wt % of polyethylene glycol, 0.5-1.5 wt % of carboxymethylcellulose, and a balance of water.

10. A method as claimed in claim 2 including drying the liquid after applying it to the material, and then rewetting the material with water prior to removing the material.

11. A method as claimed in claim 2 including applying the liquid to the material in an amount equal to 20-30% of the volume of the material.

12. A method as claimed in claim 11 including applying the liquid to the material in an amount of less than 5 times the weight of the material.

* * * * *